May 25, 1965 P. SEBASTIANI 3,184,855
MEASURING INSTRUMENT HAVING A RESILIENTLY MOUNTED FEELER AND
A SPRING LOADED POINTER BEAM AND OPTICAL INDICATION
Filed March 6, 1961
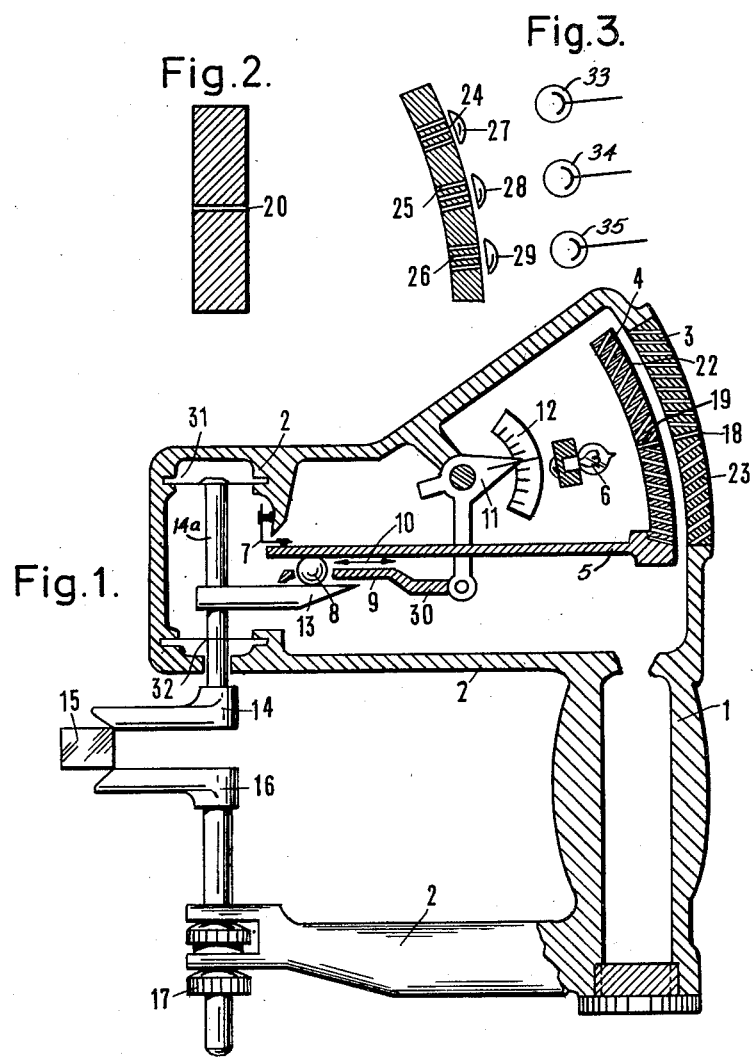
INVENTOR:
PETER SEBASTIANI
By Toulmin & Toulmin
Attorneys

# 3,184,855
MEASURING INSTRUMENT HAVING A RESILIENTLY MOUNTED FEELER AND A SPRING LOADED POINTER BEAM AND OPTICAL INDICATION Peter Sebastiani, Uberlingen, Owingerstrasse 1, Bodensee, Germany
Filed Mar. 6, 1961, Ser. No. 114,577
9 Claims. (Cl. 33—147)

The invention concerns an instrument for measuring length operating by linear displacement of a feeler and indicating the measurement by means of a light spot.

It is an object of the invention that the instrument is so constructed that whilst having a high degree of accuracy and a low temperature dependency it can nevertheless be produced cheaply and can be read clearly and readily.

Measuring instruments are known in which measurement is made by linear displacement of a feeler and indication takes place after corresponding amplification. Known measuring instruments have to be precision made, are sensitive to vibrations and are costly to produce.

Measuring instruments are known in which the feeler is spring-biased and the transmission parts so urged on one side resiliently that a positive connection between feeler and measuring mechanism is produced. The disadvantage of these arrangements is that the bearings of such known arrangements have to be very accurately machined and slight differences in a movement of the indicating mirror create false readings. Thus, it is a disadvantage if several mirrors have to be provided and if the instruments are sensitive to vibrations as are common in known instruments, it is not easy in known instruments to vary the range of measurement or to effect a difference measurement. Only a deviation from the nominal value can be established so that these instruments are "no tolerance" measuring instruments. Known instruments are designed only for absolute measurement.

Even the use of known resilient connections does not permit the construction of measuring instruments in such a manner that they are suitable both for tolerance measurements and also absolute measurements and readily and cheaply produced nevertheless whilst having a high degree of accuracy and being easy to read.

The solution of the problem in accordance with the invention resides in that firstly the feeler is spring-loaded by means of two leaf springs connected with the housing, secondly the pointer beam is connected with the housing by means of a leaf spring bent at right angles to the pointer beam and thirdly the connection between feeler and pointer beam is effected by means of a transmitting lever rigidly mounted on the feeler, which lever acts as support for the transmitting member.

The object of the invention is attained by this construction and/or by the combination of means known per se.

Contrary to all hitherto known measuring instruments bearings are deliberately dispensed with in this measuring instrument. The pointer beam has no bearings but is secured with one end by means of a leaf spring bent at right angles. The feeler does not transmit the measuring movement via bearings but via the transmitting member. Zero and/or the rest position of the feeler is enforced by means of springs, leaf springs being provided in a preferred embodiment. It is important that the housing is constantly available as a point of reference, i.e. both the springs and also the leaf springs are fixed to the housing. This spring mounting is provided being substantially remote from the handle, so that the latter does not transmit any body heat from the hand. It is also completely novel and progressive for the connection between the feeler and pointer beam to be effected by means of a transmitting member. Displacement of this transmitting member at the same time causes the transmission ratio to be varied, this displacement being positively indicated. Since it is possible for the measuring range to be varied in such a simple manner, it is sufficient to provide for only small deflections of the pointer beam. Therefore, the housing can be small. It is obvious by selecting the transmission ratio for the measuring movement to be so transmitted that vernier need not be rigidly mounted on the pointer beam. Together with this feature and moreover with the perfect optical indication and readability there is obtained a cheap and readily produced measuring instrument of considerable accuracy.

Further possibilities consist in that the transmitting member adapted to be displaced along the pointer beam is mounted unilaterally resilient. The transmitting body can be constituted by a ball member which is urged by the spring-loaded transmitting member against the pointer beam mounted unilaterally resilient. By the movement of a pointer the ball member is displaced in a reciprocating manner by a lever in dependence upon the set scale value of the pointer. This causes the transmission ratio to be varied. Such constructions require no great accuracy in manufacture, but avoid any dead movement and are very appropriate for use in a measuring instrument.

For reading purposes it is essential that a fixed and behind it a vernier displaced by the measuring force is provided, the graduation marks in the opaque vernier surfaces being of translucent design.

For the development it is provided that a vernier having translucent vernier slots is connected with the housing and behind it a vernier displaced by the pointer beam is provided, a light source behind the displaced vernier making it possible for the reading to be made when the slots in the vernier surfaces permit the light to pass therethrough.

Reading then results that, when a nominal and actual value coincide, either a light slot is illuminated or, however, a diffused light effect occurs in which the deviation of the actual value from the nominal value can be perceived.

Such a light effect is obtained by the fact that the translucent graduation marks are formed as slots, the slots of the internally displaced vernier surfaces on either side being inclined from a radial central slot towards the light source, whilst the slots of the external fixed vernier surfaces are inclined oppositely from a radial slot on either side.

To permit the tolerance fields to be clearly recognized an alternative embodiment is characterized by the feature that each three radial slots in juxtaposition to indicate the tolerance field are provided with coloured lenses supported thereon.

In this embodiment very small deflections by means of the light illumination effect of the tolerance field is obtained.

Further possibilities reside in the fact that photoelectric cells are used for further connections, or other transmitting bodies, which are displaceable along the pointer beam, to obtain the change of the transmission ratio.

An example of the invention is shown in the drawing. Further details become evident from the drawing and the description thereto.

FIG. 1 shows the measuring instrument partly in section,
FIG. 2 shows a light marking corresponding to FIG. 1,
FIG. 3 shows an embodiment having radial slots.

In FIG. 1 the housing 2 of the measuring instrument is rigidly connected to the handle 1. Above the handle the housing has a vernier surface 3 which is fixedly disposed. This vernier surface 3 is disposed opposite a vernier surface 4 which is displaceable. The surfaces comprise slitted blinds. A diaphragm defining a second vernier surface 4 is rigidly mounted on the pointer beam 5. This pointer beam is resiliently connected to the housing 2 by means of a leaf spring 7 bent at right angles. The movement of the pointer beam 5 is effected via a transmitting member 8 which in the example is constituted by a ball member 8 in the case 9 which is adapted to be reciprocated in the direction of the arrow 10 in dependence upon the movement of the pointer 11. The pointer 11 indicates on a scale 12 the sensitivity which has been set. The measuring accuracy and/or the transmission ratio becomes larger the more the transmitting member 8 approaches the pivot of the pointer beam which pivot is in the vicinity of the leaf spring 7. The measuring force is then transferred from the transmitting lever 13 to the transmitting member 8, indication being finally effected by moving the displaceable measuring feeler 14 when the work piece alters the distance between the displaceable measuring feeler 14 and the adjustable measuring jaw 16. The measuring jaw 16 is adjustable, for example, by turning the nut 17, with regard to its distance from the measuring feeler 14, so that the length measuring device is thus adapted to be adjusted to a nominal value in order then to indicate deviations of different workpieces which should have the same nomial value. The light source 6 then serves to permit an accurate reading.

In FIG. 2 there is shown the position given by FIG. 1 when the radial slots 18, 19 in the fixed and the displaceable vernier are in register. The light slot 20 now becomes visible. Any slight deviation will cause this slot 20 to disappear. Only a diffused light effect will then be noticeable, which will be perceptible in bands of light of greater or lesser brightness depending upon the deviation at the top or below the light slot 20. The light gap and/or the vernier slots 22, 23 are inclined towards or away from the source to light by an angle relative to one another corresponding to half the width of the gap, which is shown exaggerated in the drawing. The vernier slots and/or light slots of both vernier surfaces are in fact arranged parallel one above the other, on the fixed vernier surface 3 however the light gap is obscured in two or more sectors, while lenses are arranged over the exposed light gaps. Hence even with the most minute deviations of the displaceable vernier surface 4 maximum accuracy of reading is obtained. The exposed light gaps 24, 25, 26 are shown in FIG. 3. They are covered by lenses 27, 28 and 29. The lenses, for example, may be green, yellow and red in color. For example, a green light indicates the absolute required nominal value, yellow light the admissible tolerance and a red light the inadmissible deviation. There are photoelectric receivers 33, 34 and 35 disposed adjacent lenses 27, 28, and 29, respectively, to detect any light passing therethrough.

The tolerance adjustment in the example is effected as follows: The required tolerance is set on the scale 12 by means of the pointer 11. The pointer 11 via the articulated lever 30 and cage 9 then displaces the transmitting body 8. This causes the transmission ratio of the pointer beam 5 to be varied. In this way it is possible by means of this instrument, for example, to set tolerances between $\frac{1}{100}$ and $\frac{1}{1000}$ mm. continuously. It is possible for the measuring jaw 14 to be mounted in other spring elements than in the leaf springs 31, 32.

The field of application of the invention includes all possibilities in which the intention is to obtain practically an unlimited accuracy of measurement by means of an instrument of simple but robust structure and low manufacturing costs.

What is claimed is:

1. In a measuring instrument, the combination comprising, a housing having a handle, a measuring feeler projecting from the housing and being resiliently mounted therein, a pointer beam, a leaf spring having one end secured to the housing and the other end rigidly fastened to the pointer beam to pivotally fasten said pointer beam in said housing, a transmitting lever rigidly fastened to the measuring feeler, an indicating means comprising a slitted blind carried by the pointer beam, a second slitted blind in the housing opposite the first blind, and a light source within the housing adjacent the blinds.

2. In a measuring instrument, the combination as set forth in claim 1, wherein a transmitting member is seated on said transmitting lever for transmitting displacement of said feeler as angular deflection of said pointer beam, and optical means for indicating the deflection of said beam.

3. In a measuring instrument, the combination as set forth in claim 1, wherein a transmitting element is seated on said lever and engaging said pointer beam, and wherein means are provided for adjusting said transmitting element along said pointer beam.

4. In a measuring instrument, the combination as set forth in claim 1, wherein a ball is seated on said lever and which is urged towards said pointer beam for positive engagement therewith, and also wherein means include indicating means for adjusting the position of said ball on said lever, and wherein optical means are provided for indicating the deflection of said pointer beam.

5. In a measuring instrument, the combination as set forth in claim 1, wherein a transmitting member is seated on said lever engaging said pointer beam, and wherein there is a position adjustable cage for said members, and optical means for indicating the deflection of said pointer beam.

6. In a measuring instrument, the combination as set forth in claim 1, wherein means are provided for transmitting displacements of said feeler as tiltable deflection upon said pointer beam, and optical means for indicating the deflection of said pointer beam.

7. In a measuring instrument, the combination as set forth in claim 1, there being a radially directed slot in each slitted blind, a light source in said housing disposed in the direction defined when said two radially directed slots register, the remaining slots in said first slitted blind being inclined relative to the radial slot therein away from said light source, while the remaining slots in said second slitted blind are inclined in the opposite direction.

8. In a measuring instrument, the combination as set forth in claim 1, wherein three differently colored lenses are respectively disposed adjacent several slots of said first slitted blind.

9. In a measuring instrument, the combination as set forth in claim 1, comprising in addition, photoelectric receiver cells disposed outside of said housing in front of several slots of said first slitted blind.

References Cited by the Examiner
UNITED STATES PATENTS

| | | | |
|---|---|---|---|
| 1,918,556 | 7/33 | Pfau | 88—14 |
| 2,016,014 | 10/35 | Mackenzie | 33—147 |
| 2,018,384 | 10/35 | Schoof | 33—172 |
| 2,246,485 | 6/41 | Aller | 33—178 |
| 2,577,219 | 6/51 | Flint | 88—14 |

FOREIGN PATENTS

| | | |
|---|---|---|
| 1,109,384 | 6/61 | Germany. |
| 389,541 | 3/33 | Great Britain. |
| 333,736 | 1/36 | Italy. |
| 100,203 | 11/40 | Sweden. |

ISAAC LISANN, *Primary Examiner.*